March 22, 1927. 1,621,536
E. G. HANDTE
KIT FOR WAGONS, TRUCKS, AND THE LIKE
Filed Sept. 14, 1926
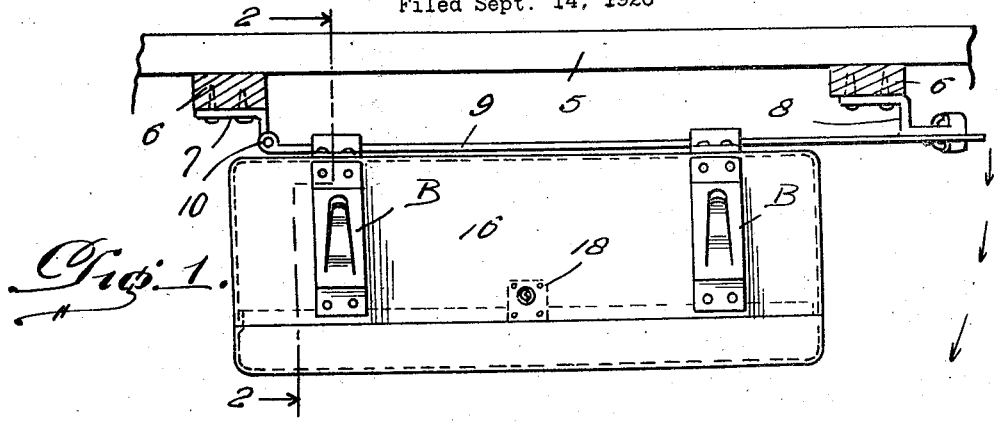
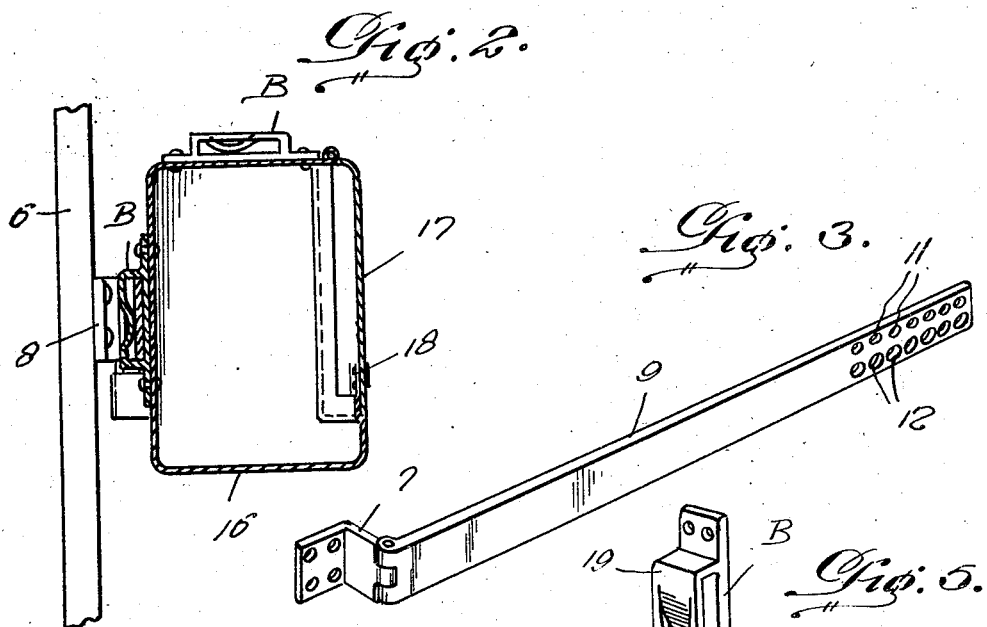
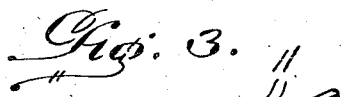
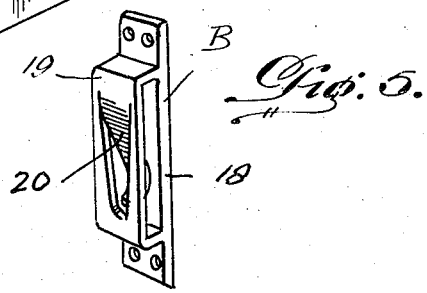
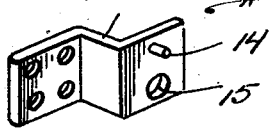
Inventor
Elmer G. Handte,
By Clarence A. O'Brien
Attorney Patented Mar. 22, 1927.

1,621,536

UNITED STATES PATENT OFFICE.

ELMER G. HANDTE, OF PITTSBURGH, PENNSYLVANIA.

KIT FOR WAGONS, TRUCKS, AND THE LIKE.

Application filed September 14, 1926. Serial No. 135,348.

The present invention relates to a handy kit for wagons, trucks, and the like which may be conveniently mounted so as to provide a place for storing such articles as cigarettes, matches, and the like which the driver of the wagon or a truck may desire.

Another important object of the invention lies in the provision of a device of this nature including a receptacle slidably mounted on a hinged bar.

A still further very important object of the invention lies in the provision of a kit of this nature which is simple in its construction, inexpensive to manufacture, strong and durable, and otherwise well adapted for the purpose for which it is designed.

With the above and numerous other objects in view as will appear as the description proceeds, the invention resides in certain novelties of construction, and in the combination and arrangement of parts as will be hereinafter more fully described and claimed.

In the drawings:

Figure 1 is a top plan view of my improved kit,

Fig. 2 is a section taken substantially on the lines 2—2 of Fig. 1,

Fig. 3 is a perspective view of the hinged bar,

Fig. 4 is a perspective view of one of the brackets, and

Fig. 5 is a perspective view of one of the sliding brackets.

Referring to the drawings in detail, it will be seen that 5 denotes the top or side of a wagon having the ribs 6 extending therealong. These portions 5 and 6 are illustrated merely by way of example to show one practical mounting of the kit and it is to be understood that any suitable support will suffice for the purpose.

An L-shaped bracket 7 is secured to one rib 6 and a V-shaped bracket 8 is secured to the other rib 6. A bar 9 is hingedly engaged at one end as at 10 with the L-shaped brackets 7. The free end of the bar is provided along its upper edge with a row of relatively small apertures 11 and along its lower edge with a series of relatively large apertures 12. The bracket 8 is provided with a pin 14 adapted to fit one of the openings 12 and an opening 15 adapted to register with one of the openings 12. It will therefore be seen that the brackets 7 and 8 of the bar member may be used where the distances between the ribs 6 vary.

The numeral 16 denotes a receptacle having a hinged lid 17 associated with which is a suitable lock 18. On two sides of the receptacle 16 there is mounted a pair of brackets indicated generally by the letter B. Each bracket B includes a plate 18 forming the base of the bracket and a U-shaped frame 19 the extremities of which are formed integrally with the plate 18. The bight portion of the U-shaped frame 19 has struck therefrom a spring tongue 20 which extends inwardly towards the base plate 18 and at its extremity is curved from the base plate. As is apparent from an inspection of Figs. 1 and 3 the bar 9 is adapted to extend through the frame 19 of the brackets B and the spring tongues 20 sectionally engage the bar 9 to prevent accidental sliding along the bar after the receptacle has been placed in a desired position. When the receptacle has been engaged on the bar 9 as just described, it will be seen that a padlock or the like may be engaged through the registering openings 12 and 15.

It will be seen that a device of this nature is very handy and may be mounted in a large variety of places and has an adjustment to accommodate the support. The receptacle may be very easily removed from the bar when desired yet will be prevented from accidental sliding thereon.

It is thought that the construction, utility, and advantages of this invention will now be apparent to those skilled in this art without a more detailed description thereof. The present embodiment of the invention has been disclosed in detail merely by way of example, since in actual practice it attains the features of advantage enumerated as desirable in the statement of the invention and the above description. It is apparent that changes in the details of construction, and in the combination and arrangement of parts may be resorted to without departing from the spirit or scope of the invention as hereinafter claimed nor sacrificing any of its advantages.

Having thus described my invention, what I claim as new is:

1. A device of the class described, including in combination a pair of brackets, a bar hingedly mounted on one of the brackets, the free end of the bar being provided with a row of relatively small apertures adjacent one edge and a row of relatively large apertures adjacent the other edge, the bracket adjacent the free end of the bar being provided with a pin for engaging the smaller openings and an opening adapted to register with one of the larger openings, a receptacle, slide brackets on the receptacle adapted to receive the bar, each slide bracket including a base plate, a U-shaped frame having its edges merging into the base plate and a bight portion having struck therefrom a spring tongue extended inwardly towards the base plate.

2. A device of the class described including, in combination, a bar, means for mounting the bar, a receptacle, slide brackets on the receptacle adapted to receive the bar, each slide bracket comprising a base plate, a U-shaped frame having its edges merging into the base plate, and a bight portion having struck therefrom a spring tongue extending inwardly towards the base plate.

In testimony whereof I affix my signature.

ELMER G. HANDTE.